(12) United States Patent
Müller et al.

(10) Patent No.: US 8,154,144 B2
(45) Date of Patent: Apr. 10, 2012

(54) LINEAR GENERATOR WITH A PRIMARY PART AND A SECONDARY PART FOR POWER GENERATION IN A WAVE-DRIVEN POWER STATION AND WAVE-DRIVEN POWER STATION

(75) Inventors: Jens Müller, Bonn (DE); Jan Wiezoreck, Bonn (DE); Ingolf Hahn, Bonn (DE); Carsten Bührer, Bonn (DE)

(73) Assignee: Zenergy Power GmbH, Rheinbach (DE)

( * ) Notice: Subject to any disclaimer, the term of this patent is extended or adjusted under 35 U.S.C. 154(b) by 410 days.

(21) Appl. No.: 12/532,967

(22) PCT Filed: Mar. 25, 2008

(86) PCT No.: PCT/EP2008/002332
§ 371 (c)(1),
(2), (4) Date: Sep. 24, 2009

(87) PCT Pub. No.: WO2008/116621
PCT Pub. Date: Oct. 2, 2008

(65) Prior Publication Data
US 2010/0117367 A1    May 13, 2010

(30) Foreign Application Priority Data

Mar. 27, 2007    (DE) .................. 10 2007 015 168

(51) Int. Cl.
*F02P 6/00* (2006.01)
(52) U.S. Cl. ................. 290/53; 290/54; 290/55
(58) Field of Classification Search .............. 290/53, 290/54, 55
See application file for complete search history.

(56) References Cited

U.S. PATENT DOCUMENTS 5,410,199 A    4/1995    Kinugasa et al.
(Continued)

FOREIGN PATENT DOCUMENTS

EP    0 425 314 A    5/1991
(Continued)

OTHER PUBLICATIONS

Cussac, Yolaine, English Translation of the PCT International Preliminary Report and Written Opinion of the International Searching Authority for PCT/EP2008/002332, date of Mailing Oct. 15, 2009), 11 pages, The International Bureau of WIPO, 34, chemin des Colombettes, 1211 Geneva 20, Switzerland.

(Continued)

*Primary Examiner* — Tulsidas C Patel
*Assistant Examiner* — Iraj A Mohandesi
(74) *Attorney, Agent, or Firm* — Fay Sharpe LLP

(57) ABSTRACT

A linear generator for power generation in a wave-driven power station is provided. The linear generator includes a primary part which has a plurality of annular primary coils, which are arranged concentrically with respect to an axis and are separated from one another by intermediate elements, and a secondary part which has a plurality of secondary coils, to which direct current can be applied. The secondary coils are arranged axially alongside one another with alternating polarity and have superconductor windings. The arrangement of the primary coils in the primary part is in the form of an air-gap winding with intermediate elements composed of non-magnetizable material. The primary part or the secondary part is moved parallel to the axis, in an externally operated manner, by a buoy and the current which is induced in the primary coils by the relative movement between the primary part and the secondary part can be tapped off for power generation.

20 Claims, 7 Drawing Sheets

U.S. PATENT DOCUMENTS

| | | | |
|---|---|---|---|
| 5,758,911 A * | 6/1998 | Gerhardt | 290/55 |
| 6,020,653 A | 2/2000 | Woodbridge et al. | |
| 6,153,944 A * | 11/2000 | Clark | 290/54 |
| 6,580,177 B1 * | 6/2003 | Hagood et al. | 290/1 R |
| 2004/0061338 A1 | 4/2004 | Woodbridge | |
| 2005/0099010 A1 | 5/2005 | Hirsch | |
| 2005/0235641 A1 | 10/2005 | Sabol | |

FOREIGN PATENT DOCUMENTS

| | | |
|---|---|---|
| EP | 0 774 826 A | 5/1997 |
| EP | 1 465 328 A | 10/2004 |
| EP | 1 811 638 A | 7/2007 |
| FR | 2 266 358 A | 10/1975 |
| JP | 56074082 A | 6/1981 |
| WO | WO 2004/090324 A | 10/2005 |

OTHER PUBLICATIONS

Le Chenadec, Herve, International Search Report for PCT/EP2008/002332, completed Jul. 29, 2008, mailed Aug. 7, 2008, 6 pages, European Patent Office.

* cited by examiner

LINEAR GENERATOR WITH A PRIMARY PART AND A SECONDARY PART FOR POWER GENERATION IN A WAVE-DRIVEN POWER STATION AND WAVE-DRIVEN POWER STATION

This application claims priority to and the benefit of the filing date of International Application No. PCT/EP2008/002332, filed 25 Mar. 2008, which application claims priority to and the benefit of the filing date of German Application No. 10 2007 015168.5, filed 27 Mar. 2007, both of which are hereby incorporated by reference into the specification of this application.

The invention relates to a linear generator for power generation in a wave-driven power station. The linear generator includes a primary part and a secondary part. The primary part has a plurality of annular primary coils, which are arranged concentrically with respect to an axis and are separated from one another by intermediate elements. The secondary part has a plurality of secondary coils, to which direct current can be applied and which are arranged axially alongside one another with alternating polarity and have superconductor windings. One part can be moved backward and forward parallel to the axis relative to the other part. The invention also relates to a wave-driven power station having a linear generator such as this.

BACKGROUND

DE 195 42 551 A1 discloses a linear motor having a hollow-cylindrical primary part, which has annular primary coils which are arranged concentrically with respect to a movement axis of a secondary part and can be operated with polyphase current. Annular laminates composed of soft-magnetic material are arranged between the primary coils, are used as intermediate elements to separate adjacent primary coils, and form magnetizable teeth, in order to amplify the magnetic flux and to pass this to the receptacle in which the secondary part is arranged. The primary coils and the annular laminates are accommodated in a hollow-cylindrical yoke composed of magnetizable material, which forms a magnetic return path. The secondary part is arranged such that it can move axially within the receptacle that is formed by the primary part. The secondary part has a plurality of field magnets composed of superconductor windings, which are arranged one behind the other with alternating polarity in the axial direction. In DE 195 42 551, the magnetic fields of the secondary windings are at right angles to the axis of the secondary part. In order to produce this field direction using wound coils, the axis of each individual coil through which current flows must be at right angles to the movement axis of the linear motor. Only if permanent magnets or superconducting solid-body magnets are used can these magnets rest with their inner circumferential surface on a cylindrical yoke composed of magnetizable material. Although these then have an annular shape, they are magnetized radially, however. In the case of wound secondary coils, in contrast, an arrangement must be chosen in which the wound coils are offset alongside one another in the circumferential direction and in the axial direction on the casing surface of the supporting body. The magnetic forces which are produced when current is applied to the primary and secondary coils produce a relative movement between the primary part and the secondary part.

EP 1 465 328 A1 discloses a linear motor in which the primary part and secondary part are arranged reversed, such that the secondary part is on the outside, and surrounds the primary part.

The capability to magnetize the soft-magnetic teeth is restricted because magnetic saturation occurs in the soft-magnetic material. In order to achieve higher force densities between the primary part and secondary part with high current densities in the coils of the primary part, it has been proposed that the number of turns in the primary coils be increased or that the amount of magnetizable material be increased. These measures have allowed force densities of up to about 8 N/cm$^2$ to be achieved in the trials stage for round and polysolenoid linear motors. However, the physical size and the weight of the linear motors have to be significantly increased to do this.

SUMMARY OF INVENTION

In accordance with the present invention, provided is a linear generator for power generation for a wave-driven power station, as well as a wave-driven power station, which make it possible to achieve a high electricity yield from the movement of sea waves by design measures in the primary part and/or the secondary part, as well as the physical design of the wave-driven power station.

According to one aspect of the invention, a linear generator for power generation for a wave-driven power station includes a primary part having primary coils and a secondary part having secondary coils. The arrangement of the primary coils in the primary part is in the form of an air-gap winding with intermediate elements composed of non-magnetizable material, and the secondary coils comprise windings of a high-temperature superconductor, as a result of which force densities of more than 18 N/cm$^2$ can be achieved. The secondary coils are annular and are arranged concentrically with respect to one another around the supporting body, wherein spacing elements are arranged between the secondary coils, on which spacing elements the secondary coils are supported in the axial direction. In order to achieve the relative movement between the primary part and the secondary part, the primary part or the secondary part can be moved parallel to the axis, in an externally operated manner, by a buoy of a wave-driven power station and the current which is induced in the primary coils by the relative movement between the primary part and the secondary part can be tapped off for power generation. The relative movement between the primary part and the secondary part induces a current in the primary coils, which current is converted and used for power generation. Since the arrangement of the primary coils and also the arrangement of the secondary coils are in the form of an air-gap winding, that is to say no magnetizable material for flux guidance is arranged either between the primary coils or between the secondary coils, the force density in the linear generator according to the invention is not limited by saturation magnetization.

According to another aspect, current level in the primary part, that is to say the current in the circumferential direction per axial length of the primary part, can be increased in comparison to known linear motors without enlarging the physical size of the linear motor, as a result of which the force density, which is proportional to the current level, rises without saturation effects. No iron or magnetizable material for concentration of the magnetic flux is arranged between the primary coils. The use of secondary coils composed of high-temperature superconducting material, which has a critical temperature which is higher than 77K, in the secondary part allows large direct currents to be applied to the secondary coils, in order to make it possible to produce extremely strong magnetic fields in the receptacle. A further advantage with the linear generator according to the invention is that a force profile which is virtually smooth in the axial direction is achieved since the air-gap winding means that there are largely no reluctance forces in practice, and in consequence scarcely any cogging forces occur. Furthermore, since there are no permanent magnets and magnetizable material in the primary part and secondary part, and no magnetic forces therefore occur when the current that is supplied is switched off, the linear generator can be serviced and cleaned relatively easily.

In principle, the primary part could also be moved when using the linear generator according to the invention for power generation in a wave-driven power station. In one refinement for power generation in a wave-driven power station, the secondary part can be moved mechanically by means of a rising and falling buoy.

According to one aspect of a corresponding linear generator or wave-driven power station, the secondary part can be connected, such that they move together, to a rigid coupling or transmission element such as a rod which is connected to the buoy in order to transmit the movement of the buoy to the secondary part. The use of a rod which is connected directly or indirectly to the buoy, or of some other support profile, as a coupling element for movement transmission offers, inter alia, advantages in the sealing of the entire structure, which is used in the offshore area and is therefore subject to extremely severe environmental influences, against the ingress of moisture. The entire structure of the wave-driven power station can be designed in such a manner that all the components and supply appliances which are essential for operation are arranged in a protected manner in a closed and/or sealed area, and only the rigid coupling element, which is suitable for power transmission, is passed out of this area.

According to one exemplary embodiment of a linear generator or wave-driven power station, the buoy has float bodies whose buoyancy keeps the buoy on the water surface, wherein the primary part is arranged in an underwater body, relative to which the buoy can be moved by the wave movement of the water. The primary part and the secondary part can then be arranged in a closed receptacle in the underwater body which, on its upper face, has an aperture for the coupling element, for mechanical transmission of the movement. The float bodies of the buoys can then be arranged around a central aperture, which forms an axial guide for movements between the underwater body and the buoy. Furthermore, the underwater body in this embodiment may have a cylindrical outer housing section, which is guided in the aperture, and/or bearing elements, in particular sliding bearing rings or sliding cushions, by means of which the sliding guidance between the buoy and the underwater body can be improved or, if appropriate, it is possible to prevent sea water being moved as a result of the relative movement between the buoy and the underwater body and counteracting this relative movement with relatively great resistance, thus reducing the efficiency of the wave-driven power station. The underwater body is essentially rigidly coupled to the primary part. According to one embodiment, the underwater body can be connected to a ballast body which ensures that there is a relatively constant distance between the underwater body and the seabed, wherein the underwater body and/or the ballast body are preferably anchored on the seabed via a mooring cable. The mooring cable may also comprise attachment cables, or may be composed thereof, which are at the same time used as power transfer cables, or contain such cables, in order to transport the electrical power first of all to the seabed and then to land. Alternatively or additionally, the ballast body may have at least one platform, preferably at least two platforms which are vertically separated from one another, wherein the intermediate space between the platforms is open or can be opened for sea water to enter, in order by means of the platforms to support the "fixed-position" floating state of the underwater body relative to the seabed. The underwater body, which is provided with platforms and is relatively inert, can virtually passively maintain its position in the sea, while the wave movement oscillates at a considerably higher frequency and with a considerably greater amplitude, and to this extent exposes different lengths of the underwater body, while the considerably less inert and lighter buoy, with its float bodies, floats permanently on the water surface and is also moved by the movement of the sea wave. The sea wave and in consequence the buoy can move, for example, with a period of 12 s.

According to another aspect, the ballast body may have a tank which is at least partially filled with sea water wherein the filling level of the tank is variable, in order to vary the frequency between the buoy on the one hand and the underwater body on the other hand, and to this extent indirectly the movement and the movement frequency between the secondary part and the primary part of the linear generator, and to approximate to a resonant frequency. The ballast body and the underwater body produce buoyancy which keeps the underwater body close to or closely below the water surface such that, depending on the wave movement, the only area of the underwater body which projects above the water surface is that in which the primary part with the primary windings is located.

Furthermore, the buoy can be provided with fittings to which the free end of the mechanical coupling element is attached, and/or which are arranged within the switching and supply devices for the linear generator. All of the devices which are required for supplying, for example the cryostat for cooling the HTS superconductor coils below the critical temperature and, if appropriate, also the switching apparatuses for processing and outputting the current induced in the primary coils can then be arranged in a protective manner above the water surface. The mechanical coupling element for movement transmission can comprise a hollow rod or tube or some other hollow profile which, with its cavity, is used as a line bushing for supply lines between the switching and supply devices arranged on the buoy, on the one hand, and the primary and secondary part of the linear generator, on the other hand.

According to one alternative aspect of a linear generator or wave-driven power station, the underwater body may have a cylindrical mast or an outer housing section, whose lower end is connected to a ballast body and whose outer wall is used as an axial guide for an underwater sliding element which forms the buoy, can be moved relative to the underwater body and is provided with fittings to which the free end of the coupling element is attached. The primary part and the secondary part can then be arranged in a closed receptacle in the underwater body, and the underwater body can be connected to a surface float body which has an aperture for the coupling element on its upper face, and which is provided with guide elements for the fittings or for guide rods, which are connected to them, as an axial guide. In this refinement of a wave-driven power station, two elements which are guided coaxially on one another once again interact, wherein, however, the movement of the secondary part relative to the coils of the primary part in principle takes place completely below the water surface. The longer the fittings are, the greater the relative movement may be between the primary part and the secondary part, wherein the underwater sliding element can be guided well on the mast or outer housing section of the underwater body which accommodates the primary part. The switching and supply devices for the linear generator can preferably be arranged in the surface float body.

According to a further exemplary embodiment for a linear generator or a wave-driven power station, the underwater body may be attached to the seabed, and may be anchored to the seabed via a base plate, wherein one end of the coupling element, which is passed out of the underwater body, is connected by means of a hawser or cable to the buoy, which floats on the water surface and is moved up and down by the wave movement. The secondary part is movable against the restoring force of a mechanical restoring means such as a spring, by the buoy. The switching and supply devices for the linear generator can be arranged in the underwater body, since the underwater body is stationary and does not float. All of the supply lines can be laid on the seabed.

According to yet another exemplary embodiment of a wave-driven power station, the buoy may be in the form of an underwater bell which can be moved by the wave power relative to an underwater body which is anchored on the seabed and is closed by means of the underwater bell to form a sealed, gas-filled resonant device. If required, the frequency of the resonant device can be influenced and adjusted or controlled by the gas pressure, by the filling volume or by the filling gas that is used. Air or else a gas which can be used together with the coolant for the HTS superconductor coils can be used as the filling gas. The primary part and the secondary part including all the switching and supply devices can be arranged in the accommodation area of the resonant device between the underwater body and the underwater bell. Furthermore, the underwater body may have a cylindrical outer wall which forms an axial guide for a cylindrical housing section on the underwater bell, or interacts with it via axial guides.

In all of the exemplary embodiments, the primary part which is provided with primary coils and can be used for current induction may be at least three times as long as that section of the secondary part which is provided with superconducting secondary coils. A high current level in the primary part can be achieved in particular by choosing a high filling factor for the primary part. The filling factor is defined as the volume ratio of the volume of the primary coils through which current flows to the volume of the intermediate elements, and any intermediate spaces present between the primary coils. According to one aspect, the filling factor of the primary part is greater than 70%, and in particular greater than 85%. Primary coils which are adjacent in the axial direction produce an alternating current which is phase-shifted through 120°, as a result of which the linear generator forms a three-phase generator. In the case of a two-phase generator or a polyphase generator having more than three phases, the phase shift may be adapted or chosen differently.

In one exemplary embodiment, the primary coils may have windings composed of a normal conductor, in particular such as a conductor composed of aluminum or copper, as a result of which the primary coils may, for example, be liquid-cooled or gas-cooled in a cost-effective manner. Cooling with water or oil, for example, particularly advantageous. In particular, the normal conductor may also be formed from a hollow conductor, whose internal tube is used for cooling. Alternatively, the windings of the primary coolers could be composed of or be manufactured from a super-conducting conductor, in particular a high-temperature superconducting conductor. The current that is applied should then be applied using alternating current at a frequency of less than 100 Hz, in particular of less than 50 Hz, in order to keep alternating-current losses in the superconducting primary coils low, which would otherwise have to be compensated for by additional coolant. An appropriate pole pitch can then be chosen in order to limit the maximum frequency in the generator mode for a given maximum speed. In the case of the linear generator according to the invention, force densities of more than 18 $N/cm^2$ can be achieved, and when using superconductors both in the secondary coils and in the primary coils, it is even possible to achieve force densities of more than 25 $N/cm^2$. Cooling lines through which a coolant can flow may also be formed between the coils, or gaps may be left open between the primary coils and if appropriate the intermediate elements, in order to cool the primary coils. The intermediate elements may be in the form of annular segments thus allowing a coolant to be passed to the end faces, which are not covered by the annular segments, of the primary coils. The intermediate elements may extend over the entire area, partially or with intermediate spaces over the radial height of the primary coils. The intermediate elements may also comprise grid structures, hollow bodies or grid bodies, which are sufficiently mechanically robust and at the same time allow a coolant to flow through them.

Furthermore, according to yet another aspect, the primary coils and the intermediate elements can be sheathed by a yoke, which is composed of non-magnetizable material, in particular a lightweight material without any iron. Alternatively, the yoke may be composed of material which does contain iron and/or which can be magnetized, for magnetic field shielding. In particular, the yoke and the intermediate elements may form a mechanical holding structure for the primary coils. In order to anchor the intermediate elements in the axial direction as well, the yoke may have slots on its internal circumference, in which slots the intermediate elements engage in an interlocking manner. Anchoring the intermediate elements on the yoke allows the primary coils to be supported in the axial direction on the intermediate elements, which means that the yoke can absorb the magnetic field forces which act on the primary coils, in the axial direction. The primary part can be formed without any iron in order to achieve a particularly lightweight design for the primary part and therefore for the linear machine, while avoiding saturation effects at the same time. Alternatively, the yoke may have a magnetizable material in order to form a return path for the magnetic flux.

According to still yet another aspect, the primary coils may be encapsulated in plastic, for example in synthetic resin, in particular in epoxy resin. The intermediate elements in one advantageous refinement of the invention are likewise manufactured from plastic, for example synthetic resin, in particular epoxy resin, and can be reinforced with fiber reinforcement, for example by insertion of glass fiber material.

According to still yet another aspect, the superconducting secondary coils can carry high current densities, for example current densities of more than 50 $A/mm^2$, furthermore of more than 70 $A/mm^2$ and in particular of more than 100 $A/mm^2$, thus making it possible to produce an extremely strong magnetic field by means of the secondary coils. The flux densities which can be produced by the secondary part in the air gap may reach more than 0.5 Tesla, more than 1 Tesla, and possibly up to 2 Tesla. The secondary part has a cylindrical supporting body adjacent to or on whose casing surface the secondary coils are arranged. The secondary coils, which comprise windings of an HTS conductor and are formed in the embodiment as double-pancake coils, are arranged such that the magnetic field of the secondary coils is aligned parallel to the axis.

According to still yet another aspect, the supporting body of the secondary part is produced from a non-magnetic material, for example from fiber-reinforced plastic. The supporting body could also be produced from or be composed of a magnetic material, in particular iron. In one refinement, the secondary coils have an annular shape and are arranged concentrically with respect to one another with respect to the axis, mounted on the associated supporting body of the secondary part. Secondary coils which are adjacent in the axial direction have direct current applied to them in antiphase, by opposite polarity connection, during operation. Once again, in order to create the air-gap winding, non-magnetizable, annular spacing elements can be arranged between the secondary coils, on which spacing elements the secondary coils are supported in the axial direction. In this exemplary embodiment, adjacent secondary coils are at a distance from one another which is at least twice as great, and preferably more than this, than the width of the respective secondary coils in the axial direction. A plurality of coils can also be combined to form a pack, all having the same current flow direction (connected in series or in parallel). A reverse current direction is then in each case applied only to adjacent coil packs.

Further advantages and features of the invention will be described in the following text with reference to exemplary embodiments of a linear generator and of a wave-driven power station which are illustrated schematically in the drawing.

DETAILED DESCRIPTION

Figure 1:
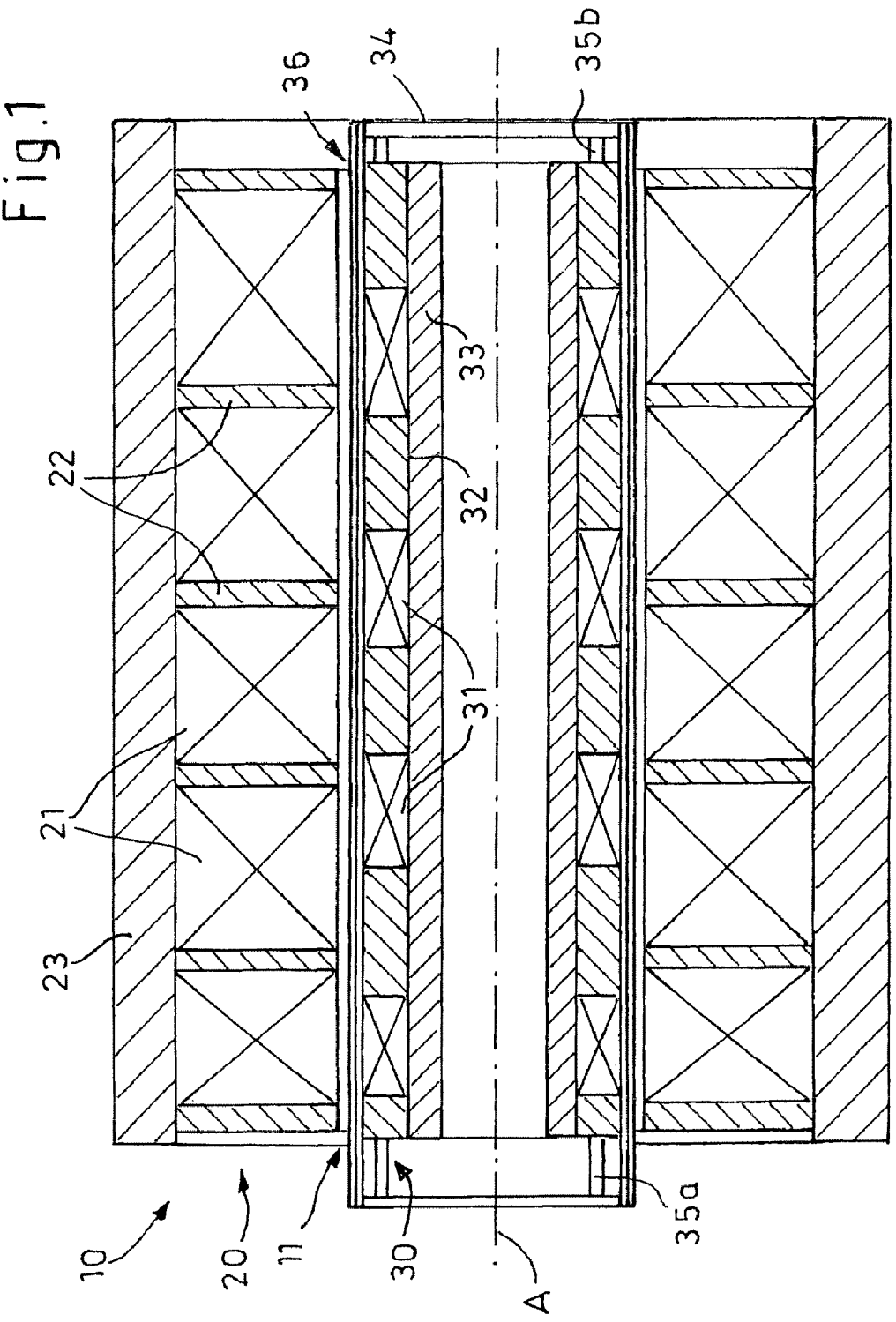
FIG. 1 shows a linear generator according to the invention having a primary part and a secondary part, according to a first exemplary embodiment, in the form of a longitudinal section.

Referring now to the drawings wherein the showings are for the purpose of illustrating preferred and alternative embodiments of the invention only and not for the purpose of limiting same, FIG. 1 illustrates a linear generator, which is annotated 10 in its totality, with a primary part 20 and a secondary part 30. The primary part 20 bounds a cylindrical receptacle 11 in which the secondary part 30 can move backward and forward along a central axis A. In the illustrated exemplary embodiment, the primary part 20 has five primary coils 21 which are arranged concentrically with respect to the axis A. The drawing shows only one generator section from an entire generator since, for example, the number of coils or coil packs must be divisible by three for three-phase operation. The primary coils 21 comprise annular disk coils on which in each case one phase of an alternating current or three-phase current which, for example, is phase-shifted through 120° can be tapped off via contacts, which are not illustrated, on their external circumference. The windings, which are composed of a copper conductor, of the primary coils 21 are encapsulated in epoxy resin, to provide mechanical robustness. Annular intermediate elements 22 are likewise arranged between the primary coils 21, on which intermediate elements 22 the end faces of the primary coils 21 are supported in the axial direction. The intermediate elements 22 extend in the radial direction from the internal circumference of the primary coils 21 to the external circumference of the primary coils 21. A hollow-cylindrical yoke 23, on which the intermediate elements 22 are anchored (not illustrated), rests on the external circumference of the intermediate elements 22 and of the primary coils 21. The yoke 23 and the intermediate elements 22 thus form a mechanical holding structure for the primary coils 21 that are accommodated therein.

The yoke 23 around the primary part 20 may be composed of non-magnetizable material or, for shielding purposes, also of magnetizable material. In the latter case, it is even possible for the force density to be increased. If the yoke 23 is composed of electrically conductive material, then it can preferably be formed by means of laminated or slotted materials, in order to reduce alternating-current losses, wherein the correct direction of the slotting or lamination can be chosen to correspond to the requirements.

By way of example, the intermediate elements 22 may be composed of glass-fiber-reinforced plastic and, according to the invention, therefore cannot be magnetized, as a result of which the magnetic field which is produced in the receptacle 11 when current is applied to the primary coils 21 is not limited by saturation magnetization of the intermediate elements 22. There is essentially no magnetizable material for flux guidance located between the primary coils 21. The arrangement of the primary coils 21 located alongside one another in the axial direction is therefore in the form of a so-called air-gap winding. These "air gaps" between the primary coils 21 are filled with the intermediate elements 22, which are possibly partially hollow and/or are used exclusively for insulation. Very broad primary coils 21 with a large number of turns per unit of axial length can therefore be used in the primary part 20. Since the volume of the intermediate elements 22 occupies only a fraction of the volume of the primary coils 21, the filling factor of the primary part with the electricity-generating turns is considerably more than 50%.

Figure 2:
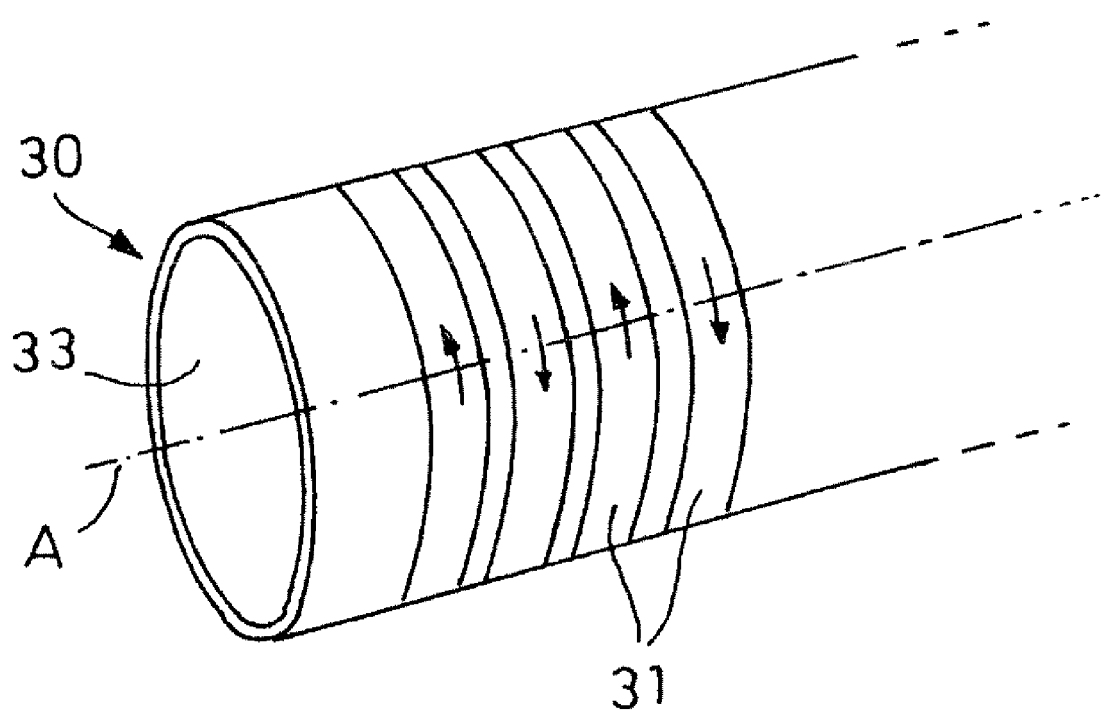
FIG. 2 shows a perspective view of the secondary part from FIG. 1.

The secondary part 30, which is illustrated in FIG. 1 and FIG. 2, has annular secondary coils 31, which are arranged concentrically with respect to the axis A and are composed of a high-temperature superconductor. These secondary coils 31, which are superconductive at cryogenic temperatures of more than 20 K, have direct currents applied to them, with secondary coils 31 which are adjacent in the axial direction being connected in antiphase. The high-temperature superconductor windings and secondary coils 31 in the secondary part 30 may be in the form of pancake coils, double-pancake coils, packs composed of these pancake coils or short solenoid coils. Annular spacing elements 32 are likewise arranged between the secondary coils 31, and are arranged concentrically with respect to the axis A. The spacing elements 32 are composed of glass-fiber-reinforced epoxy resin and are arranged together with the secondary coils 31 on a hollow-cylindrical supporting tube 33. The hollow-cylindrical supporting tube 33 may be manufactured from soft-magnetic magnetizable material such as soft-magnetic iron, or may likewise be composed, for example, of glass-fiber-reinforced plastic. In order to allow the secondary coils 31 to be cooled, for example using liquid nitrogen, the cryostat 34 is provided with a double-walled tube 36. The intermediate space, which is not illustrated, between the "warm" outer tube wall and the relatively "cold" inner tube wall of the tube 36 is evacuated, in order to prevent heat from being introduced from the outside into the cryostat 34, or to constrain it. If required, an insulation layer composed of commercially available super insulation sheet can also be fitted around the cold tube wall. Force is transmitted from the secondary part 30 to the cryostat 34 by means of schematically indicated transmission elements 35*a* and 35*b*. The transmission elements 35*a*, 35*b* are composed of a material of low thermal conductivity and high mechanical strength, for example of glass-fiber-reinforced plastics. The secondary coils 31 can be operated with current densities of up to 100 A/mm$^2$. The linear generator 10 with a primary part 20 designed according to the invention and with an air-gap winding of the primary coils and a secondary part 30 designed according to the invention allow force densities of more than 18 N/cm$^2$ to be achieved in the receptacle 11 between the primary part and the secondary part.

FIGS. 3 to 7 show different design principles for wave-driven power stations which use buoys and in which a linear generator is used, in particular designed as described further above. In all of the figures, the linear generator is in each case furthermore annotated with the reference symbol 10, the primary part is furthermore annotated with the reference symbol 20, and the secondary part is furthermore annotated with the reference symbol 30. FIGS. 3 to 7 each show the associated wave-driven power station in the position at the wave peak in the left-hand half, and in the position in the wave trough of a sea wave 51, in the right-hand half.

Figure 3:
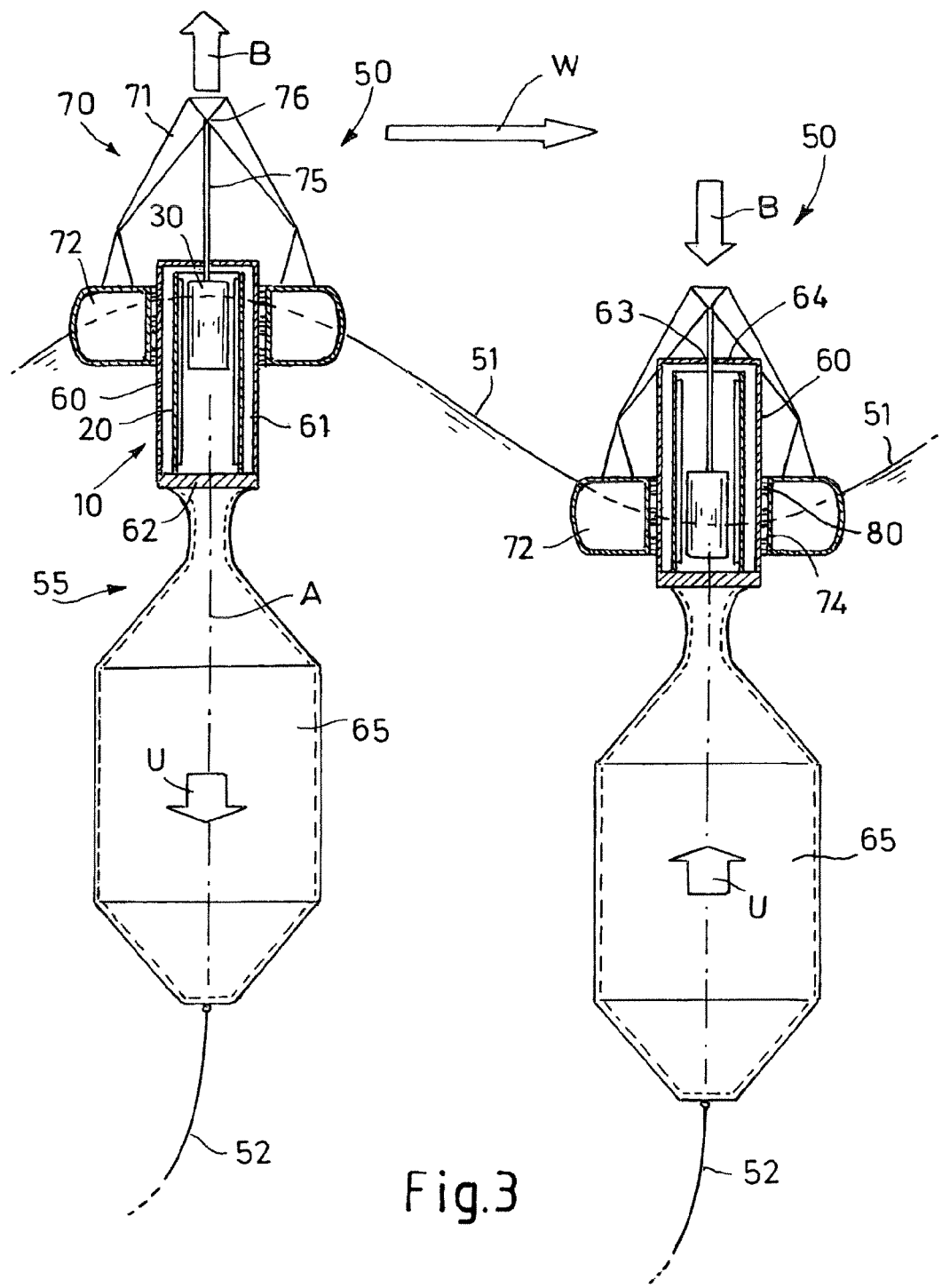
FIG. 3 shows a wave-driven power station with a linear generator, in which the secondary part is moved by means of a buoy, according to a first exemplary embodiment.

FIG. 3 shows a first exemplary embodiment of a wave-driven power station 50 which is floating in sea water and in which the linear generator 10 is arranged close to the water surface, which is indicated by means of the wave 51. The entire linear generator 10 with the primary part 20 and the secondary part 30 is arranged in a cylindrical outer housing section 60, which is designed and arranged to be coaxial with respect to the movement axis A of the linear generator 10, of an underwater body 55 which is floating in the sea water. The interior of the cylindrical outer housing section 60 forms a receptacle 61, which in this case is cylindrical, for the linear generator 10 and the upper section of the underwater body, which is annotated overall with the reference symbol 55 and is provided under the outer housing section 60 with a large-volume ballast tank 65, in order overall to provide the underwater body 55 with sufficient buoyancy in order that it can rise in the sea water close to the water surface 51. At the same time, the ballast tank 65 provides the underwater body 55 with sufficient inertia, which means that the underwater body 55 moves with a smaller amplitude than that of the wave pitch on the water surface 51. The ballast body 65, which in this case is in the form of a tank, is at least partially filled with sea water and should have a sufficiently large volume to ensure approximately fixed-position positioning of the underwater body 55 for offshore use. For accurate buoyancy adjustment, the ballast tank may, however, also additionally contain stone, concrete, steel or other materials which have a higher density than water. In order to prevent the wave-driven power station 50 from being driven away even in a heavy sea state and if the current in the sea is strong, it can be anchored to the seabed, which is not illustrated here, via a mooring cable 52. The considerably narrower, cylindrical outer housing section 60 of the underwater body 55 is connected to the ballast body 65 via a strong base plate 62. The primary part 20 of the linear generator is attached to the base plate 62, and the secondary part 30 is arranged concentrically with respect to the axis A of the primary part in the accommodation area 61 of the outer housing section 60. The axis A is essentially vertical, and the entire wind-driven power station 50 is essentially symmetrical with respect to the axis A. The length of the primary part 20 is more than twice as long, and preferably more than three times as long, as the length of the secondary part 30 which is fitted with superconductive HTS coils and can move up and down parallel to the axis A within the primary part 20. The to and fro movement of the secondary part 30 relative to the primary part 20 is achieved in the wave-driven power station 50 exclusively by the movement of the water surface 51, and by the rate of change of the amplitude of a wave, with the direction in which the waves run being indicated by the arrow W in FIG. 3. In order to produce the relative movement in the linear generator 10, the secondary part 30 is connected, such that they move together, to a transmission or coupling element, which is arranged on the axis A and, in each of the figures, is formed by a rod 75 or tube with a preferably round external diameter, and which rod 75 or tube is connected at its free upper rod end 76 to fittings 71 which are connected to the float bodies 72 of a buoy, which is annotated in its entirety with the reference symbol 70. The buoyancy of the float bodies 72 of the buoy 70 is chosen such that it floats essentially permanently with the same mean immersion depth on the water surface 51, as can be seen well from a comparison of the left-hand and right-hand illustration of the wave-driven power station 50 in FIG. 3. As indicated by the arrow B, the buoy also carries out a linear movement, essentially at the frequency and with the amplitude of the wave movement of the water surface 51, relative to the underwater body 55 since, as indicated by the arrows U, the underwater body 55 carries out a considerably smaller vertical movement passing through a wave than does the buoy 70. Because of the connection of the secondary part 30 via the rod 75 to the buoy 70 such that they move together, the axial movement of the buoy 70 relative to the underwater body 55 leads to externally operated movement of the secondary part 30 and the primary part 20 of the linear generator 10 with respect to one another as a result of which, as is known per se for a linear generator, a current can be induced in the primary coils of the primary part 20 when a magnetic field is present in the secondary part 30, which current can be converted and used for power generation. The magnetic field in the secondary part 30 is produced by direct current flowing through the superconductive coils (not shown), which are cooled below their critical temperature. Although the primary part 20 and the secondary part 30 are arranged in the upper end area of the underwater body 55 and to this extent may be located below the water surface, depending on the wave height, the accommodation area 61 for the linear generator 10 in the wave-driven power station 50 is sealed to be watertight in a relatively simple manner since, essentially, the single connecting element which is passed out of the linear generator 10 and is in contact with the surrounding area comprises the rod 75. For sealing against the ingress of moisture, the rod 75 can pass via a suitable shaft seals, which are not illustrated in any more detail, through an aperture 63 in the upper part 64 of the outer wall housing 60 of the underwater body 55.

The coaxial guidance of the primary part 20 and secondary part 30 with respect to one another in the wave-driven power station 50 is assisted by the design in that the longitudinal axis of the rod 75 coincides with the movement axis A of the linear generator 10, and in that the float bodies 72 have a central aperture 74 centrally, which interacts like an axial guide with the outer wall of the outer wall housing 60 of the underwater body 55. In order to improve the guidance between the movement bodies 72, 60 of the wave-driven power station 50, sliding or roller bearing elements 80 in the form of sliding cushions, rollers with opposing bearings, roller bearings guided in guides or the like can be arranged on the inside of the aperture 74 of the float body 72, making it possible to prevent sea water from impeding the movement between the underwater body 55 and the float bodies 72 of the buoy 70.

All of the supply devices and switching devices (not illustrated) which are required for operation of the linear generator 10, for power conversion and outputting of the power generated in the primary part 20 of the linear generator 10, can preferably be arranged in suitable chambers in the float body 72 of the buoy 70 or within the fittings 71, in order that all the supply and switching devices are permanently above the water surface 51. The power cables and supply cables, for example for the cryostat for the secondary part 30, can particularly advantageously be routed into the accommodation area 61 in the underwater body 60 via the internal cavity when using a rigid rod 75, which is at the same time hollow, as a coupling element. The illustrated tank shape, which is in the form of a double cone, of the ballast body 65 presents only an example of one of the numerous exemplary embodiments of a ballast body in the form of a tank. Furthermore, figures do not show devices by means of which the water level in the ballast body 65 can be varied, in order to trim the buoy 70 and the underwater body 55 of the wave-driven power station 50 to a resonant frequency, depending on the wave state, at which resonant frequency power can be generated particularly effectively. The filling volume in the ballast body 65 could, for example, be varied by means of valves which can be closed and opened.

Figure 4:
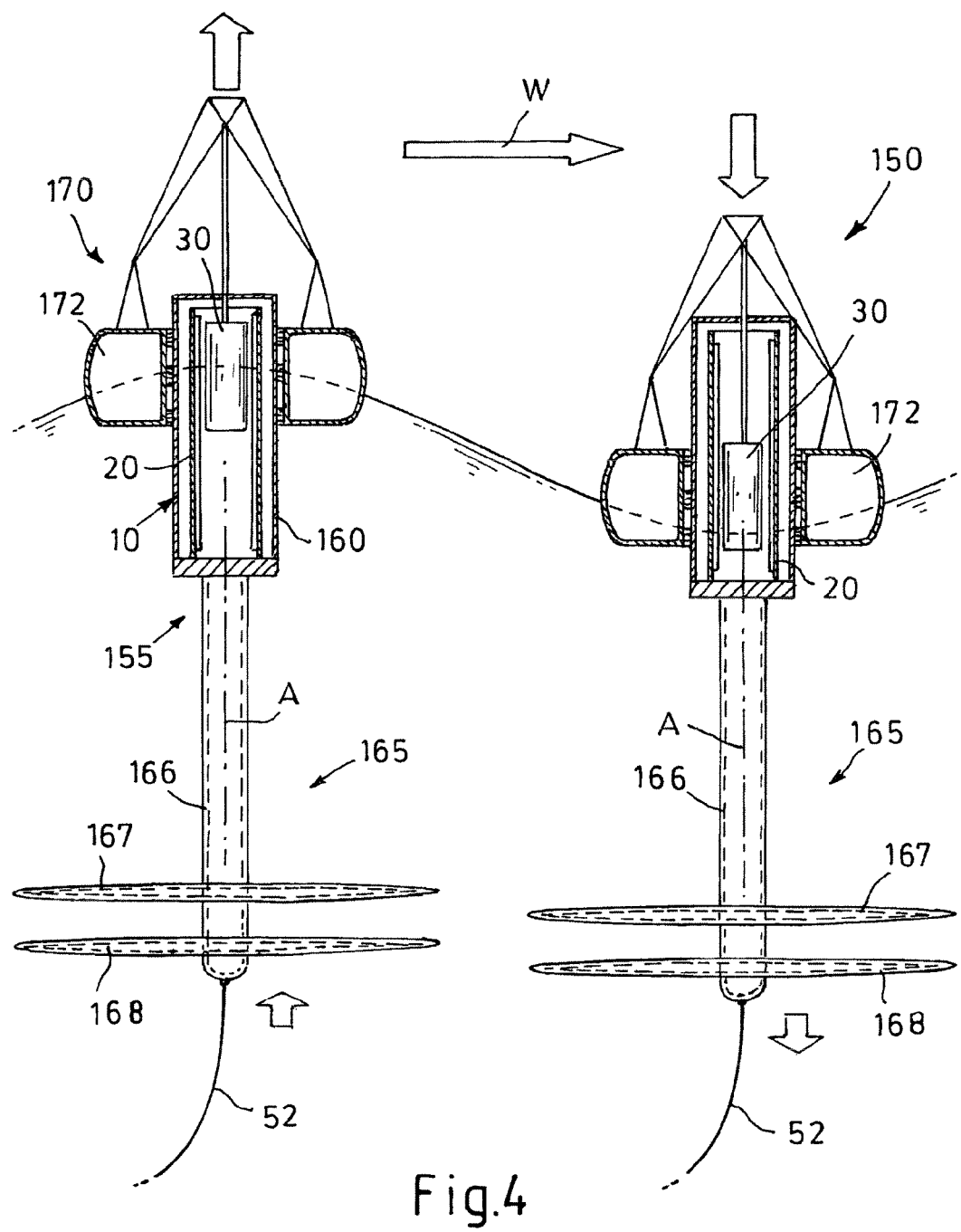
FIG. 4 shows a wave-driven power station with a buoy for driving the secondary part, according to a second exemplary embodiment.

In the wave-driven power station 150 illustrated in FIG. 4, in addition to the float bodies 172 and the outer housing section 160, which accommodates the linear generator 10 with the primary part 20 and the secondary part 30, of the underwater body 155, the buoys 170 have the same design as the exemplary embodiment shown in FIG. 3, for which reason reference is made to the statements there in order to avoid repetition. Wave-driven power station 150 differs from the wave-driven power station 50 in the configuration of the ballast body 165 which in this case does not comprise a tank but has a long mast 166 which extends parallel to the axis A and close to whose lower end two flat large-area platforms 167, 168 are attached, which extend transversally with respect to the axis A. The external size of the platforms 167, 168, in particular their diameter, is preferably considerably larger, at least twice as large, as the external diameter of the float bodies 172 of the buoy 170. The ballast body 165 forms a passive element, by means of which relative movements of the underwater body 155 relative to the seabed, which is not illustrated, are prevented to an even greater extent than in the case of the wave-driven power station 50. The passivity and to this extent position of stability of the underwater body 155 can be improved by the arrangement of at least two platforms 167, 168, from which sea water can enter. In fact, in certain offshore areas, a ballast body with only one platform of appropriate size could also be sufficient. The underwater body is anchored to the seabed via the cable 52. Alternatively, the buoy float body could also be attached to the seabed.

Figure 5:
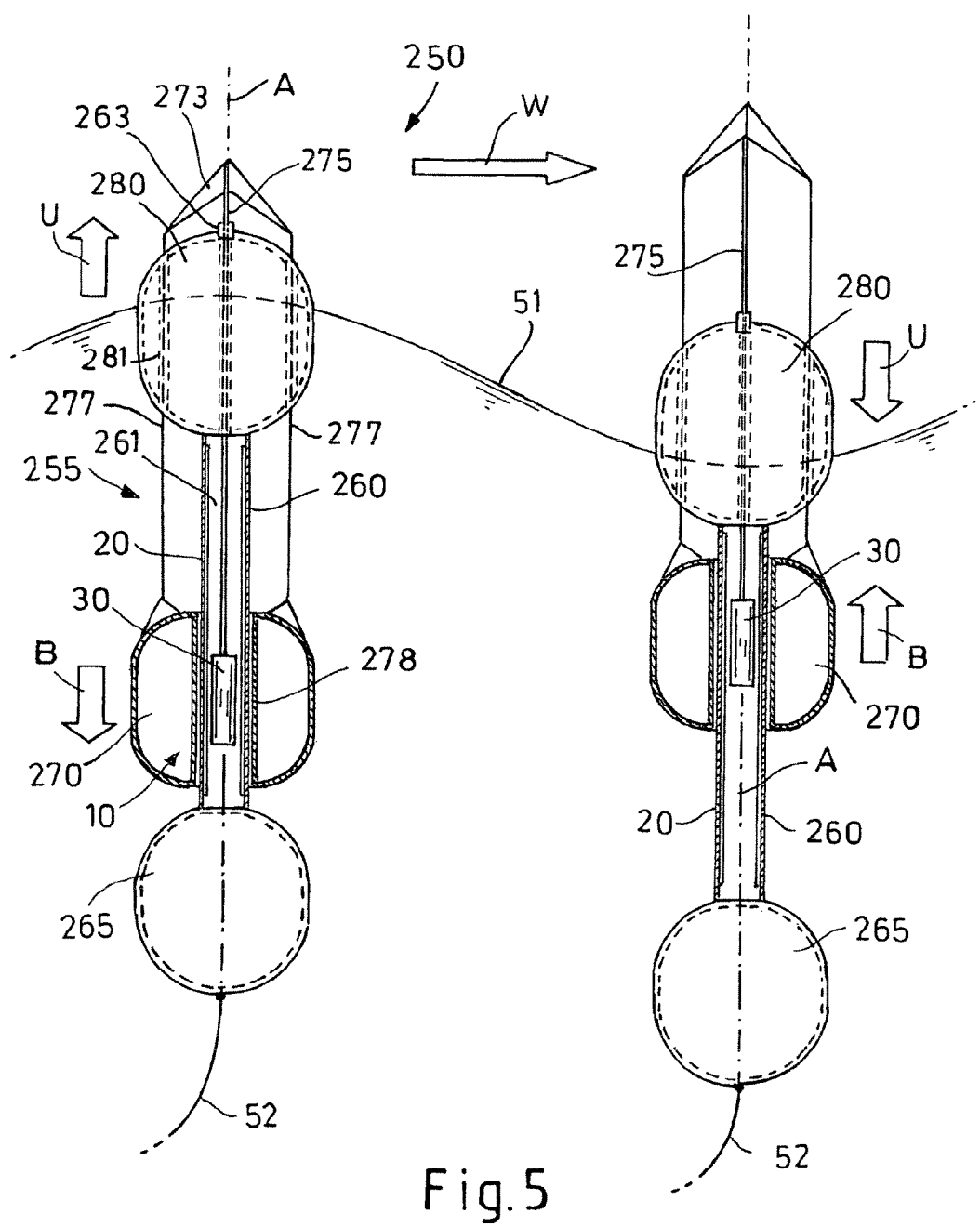
FIG. 5 shows a wave-driven power station having a buoy, which is arranged under the water surface, for moving the secondary part, according to a third exemplary embodiment.

FIG. 5 shows a third exemplary embodiment of a wave-driven power station 250, in which the secondary part 30 is connected to a buoy 270 which is permanently below the water surface 51 and to this extent forms an underwater sliding element. The relative movement between the secondary part 30, which primarily forms an actuator for the linear generator 10, and the primary part 20 which forms the stator for power generation is achieved by superimposed movement of the buoy 270 and of the underwater body 255. The underwater body 255 has a surface float body 280 above the underwater sliding element 270 which form the buoy that moves to and fro, the buoyancy of which surface float body 280 is adapted such that the surface float body 280 is kept permanently on the water surface 51. The surface float body 280 is connected via an elongated mast 260, which is aligned concentrically with respect to the axis A, with a ballast body 265 which is located below the underwater sliding element 270 and comprises a relatively heavy tank or the like, and this ballast body 265 has the function, inter alia, of keeping the movement axis A of the wave-driven power station 250 essentially vertical. The ballast body 265 is connected to the seabed via a mooring cable 52. The mast 260 which connects the ballast body 265 and the surface float body 280 is hollow, and the primary part 20 and the secondary part 30 of the linear generator 10 are arranged in this hollow chamber 261. The primary part 20 is more than three times as long as the secondary part 30. The mast 260 is connected to the surface float body 280 so as to create a cavity which is sealed and is preferably filled with air or the like. The surface float body 280 is provided with a plurality of axial guides 281, which are indicated schematically here and in which guide rods 277 are guided, which run parallel to the axis A and are connected to the underwater sliding element 270 which forms the buoy. The guide rods 277 are connected via a supporting strut 273 to a rod 275 which is arranged parallel to the axis and to which the secondary part 30 is connected such that they move together. In order to protect the cavity 261 within the mast 260, in which the linear generator 10 is arranged, against the ingress of moisture, the rod 275, in this case at the upper end of the surface float body 280, passes through an aperture 263 which is sealed in a suitable manner by means of shaft seals or the like. The outer housing section or the outer wall of the mast 260 is preferably used as an axial guide for the underwater sliding element 270 which, for this purpose, may have a relatively elongated guide cutout 278. Since, in the case of the wave-driven power station 250, the buoy 270, as indicated by the arrows B in the left-hand and right-hand halves of FIG. 5, and the surface float body 280, as indicated by the arrow U, each move in opposite senses, different amplitudes and relative movements can occur depending on the wave movement, and these could be used for power generation. The switching and supply devices can preferably be arranged in the surface float body 280, which means that they are permanently located on or above the water surface.

Figure 6:
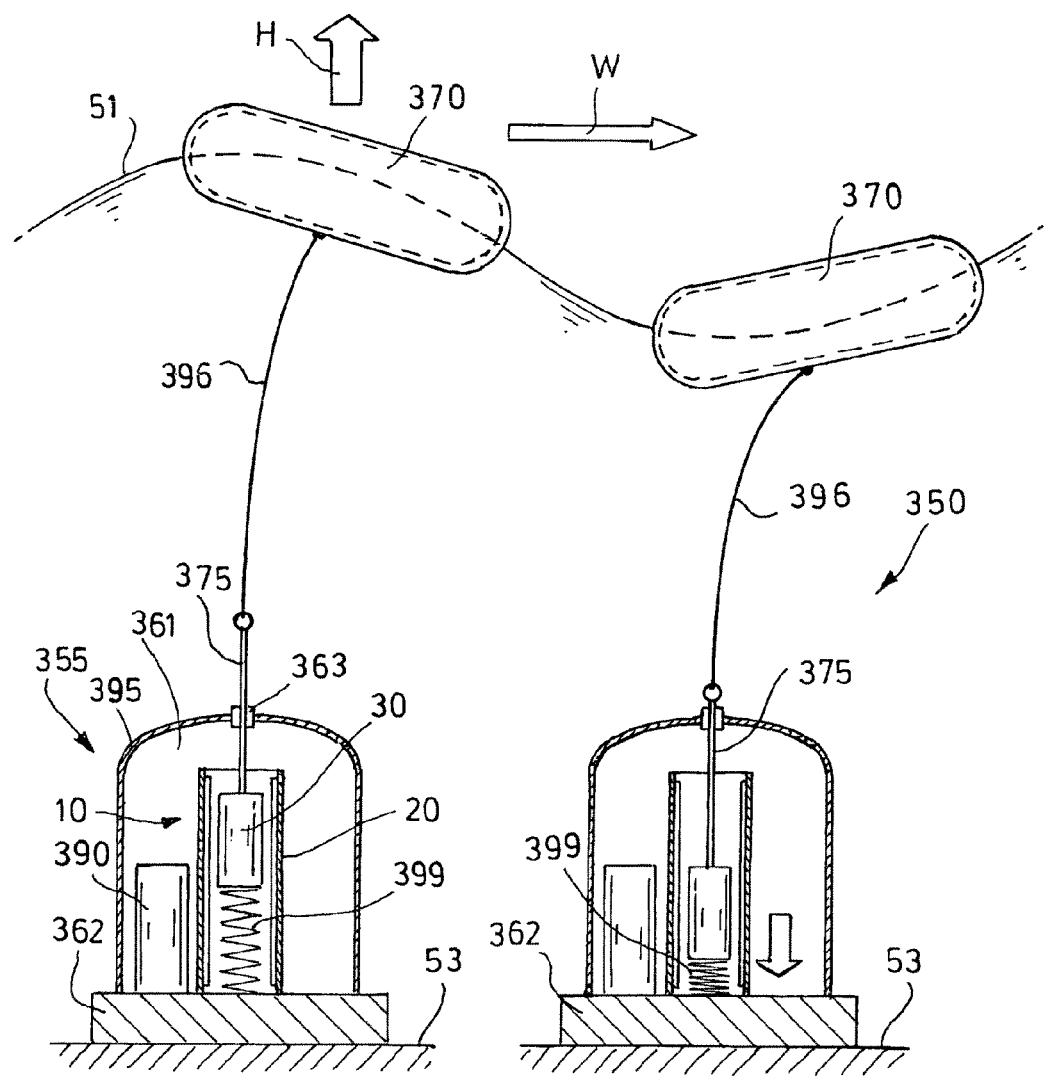
FIG. 6 shows a wave-driven power station having a buoy, floating on the water surface, for moving the secondary part, according to a fourth exemplary embodiment.

FIG. 6 shows a fourth exemplary embodiment of a wave-driven power station 350 having an underwater body 355 which is attached to the seabed 53 such that it is stationary. The underwater body 355 may have a strong base plate 362, which is anchored directly on the seabed 53. The housing wall 395 of the underwater body 355 may in principle be of any desired shape, in this case being approximately in the form of a bell, and may assume a size such that, in particular, switching and supply devices 390 for operation of the linear generator 10 can also be arranged within the accommodation area 361 that is surrounded by the housing wall 395. The relative movement between the secondary part 30 and the primary part 20 of the linear generator 10 is produced by means of a buoy 370 which floats on the water surface 51 and is in this case connected by means of a flexible cable 396 to an upper end of a rod 375. The lower end of the rod 375 is connected, such that they move together, to the secondary part 30 of the wave-driven power station 350. Since only tension forces can be transmitted via the flexible cable 396 which is connected to the buoy 370, that is to say a vertical movement can be achieved in the direction of the arrow H of the secondary part 30, the secondary part 30 has an associated restoring means, which in this case is in the form of a schematically indicated spring 399, prestresses the secondary part 30 in the direction of the base plate 362 and moves it back in that direction when no tension is exerted on the secondary part 30 via the cable 396 and the push rod 375 as a result of a wave peak. The rod 375 in turn forms the only transmission element, which is passed out of the otherwise sealed chamber 361 of the underwater body 355. The rod 375 is passed out of the underwater housing in an aperture 363 in a curved roof of the housing wall 395 of the underwater housing and, for sealing against the ingress of moisture, suitable shaft seals or the like can rest on the rod 375 in the aperture 363.

Figure 7:
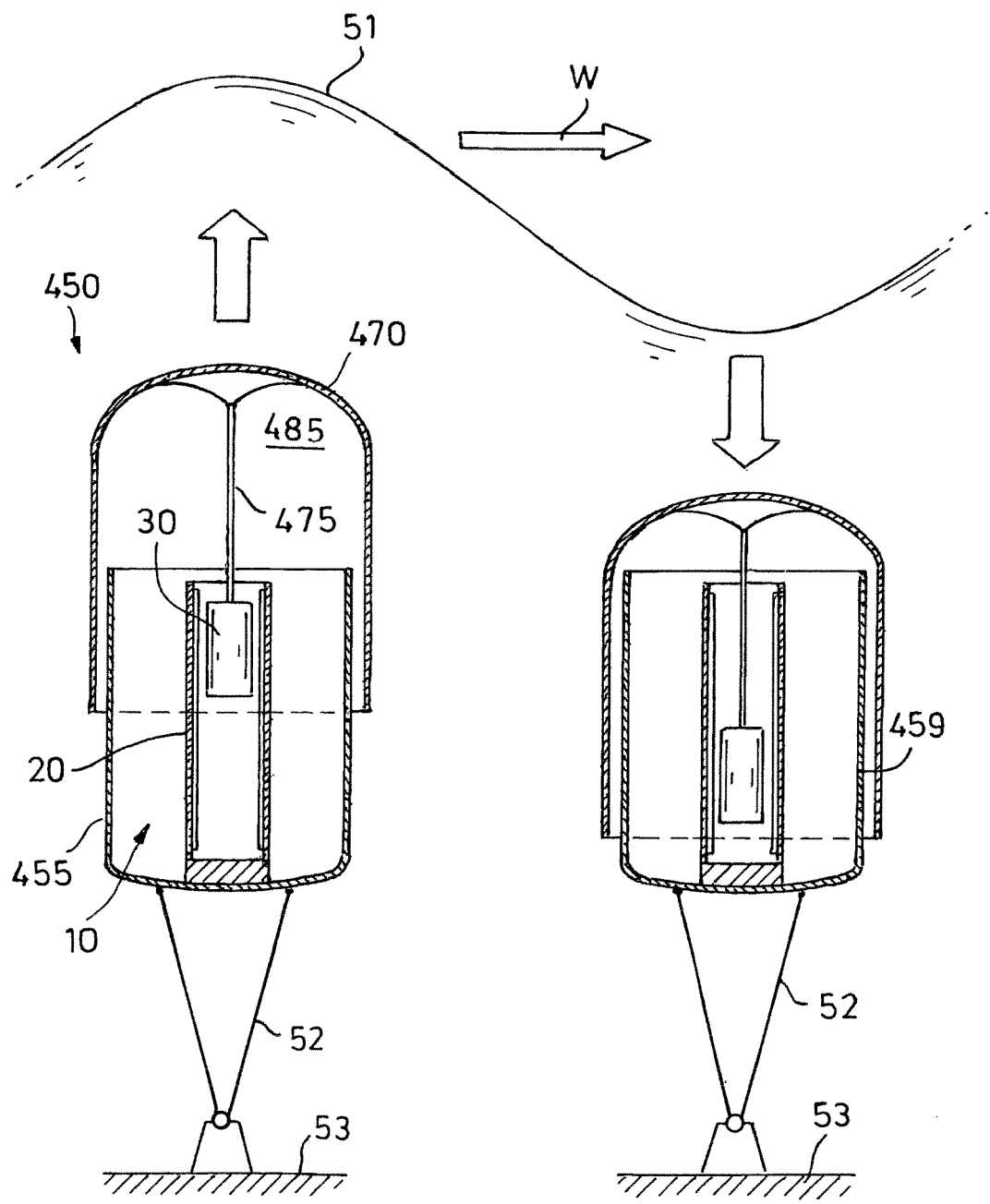
FIG. 7 shows an underwater wave-driven power station with a buoy for moving the secondary part, according to a fifth exemplary embodiment.

FIG. 7 shows a fifth exemplary embodiment of a wave-driven power station 450, which is arranged completely under the water surface 51. The linear movement for movement of the secondary part 30 relative to the primary part 20 of the linear generator 10 is transmitted primarily via underwater waves and density differences, which are caused even in deeper layers by the wave movement at the water surface 51.

For this purpose, the secondary part 30 is connected via a rod 475 to an underwater bell 470, which forms the rising and falling buoy and can be moved parallel to the axis with respect to an underwater body 455 which, for example, is in the form of a cup. The underwater body 455 and the underwater bell 470 sheath an accommodation area 485 whose volume can be varied by the different extension state of the underwater bell 470 relative to the underwater body 455, and which is filled with a suitable gas, in particular with air, in order that the wave-driven power station 450 in its entirety forms a resonant device between the underwater body 455 and the underwater bell 470. The movement between the underwater bell 470 and the underwater body 455 is preferably guided on the cylindrical outer wall 459 of the underwater body 455 by means of suitable axial guides, which are not illustrated here and may be provided with sealing devices as well as an air-gap seal, in order to prevent water droplets from being able to enter the accommodation area 485 as a result of the relative movements. The internal pressure of the gas in the accommodation area 485 can act in the form of a spring to produce the restoring movement of the underwater bell 470 to its initial position. The wave-driven power station 450 does not need a rod seal or the like because water ingress could at most occur into the accommodation area 485 between the outer wall 459 of the underwater body 455 and the inner wall of the underwater bell 470. The wave energy moves only the upper underwater bell 470, while the underwater body 455 is anchored via the mooring cable 52 on the seabed 53, essentially such that it cannot move.

Numerous modifications will be evident to a person skilled in the art from the above description and the dependent claims. A person skilled in the art can easily derive further variations and other combinations, in particular from the exemplary embodiments. In order to provide a linear generator according to the invention for a wave-driven power station with a rating of about 1 MW (megawatt), the superconductive secondary part 30 may, for example, have a diameter of about 600 mm and a length of about 600 mm, with the primary part 20 having a length, for example, of about 4 m. The number of primary and secondary coils in the axial direction represents only an example, and may vary in particular with the width of the coils and the overall length of the linear generator. The secondary coils may also be arranged in a spiral shape. The yoke and the supporting tube for the secondary part may also be composed of material containing iron. The supporting tube for the secondary part may also be omitted if the secondary coils together with the spacers have been firmly connected to one another for example by vacuum impregnation. Alternatively, the supporting tube for the secondary part may be composed of laminated and slotted magnetizable material, or likewise from, for example, glass-fiber-reinforced plastic. Hard-magnetic materials may also be used as a supporting tube in the secondary part, through which direct current flows. Particularly when using normally conductive primary coils, these coils may be cooled indirectly or preferably directly, for example by water, oil, gas or nitrogen ($N_2$).

Alternatively, a suitable gas or dry cooling can also be used, which allows an operating temperature below 77K, for example 20K or 30K. In order to further reduce eddy current losses in the primary part, the primary coils may be provided with braided-wire windings. If required, a second primary part could also be arranged within the secondary part, in order to further increase the force density. Instead of the secondary part, the primary part could also be moved parallel to the axis by the wave power. The primary part could be arranged internally, and the secondary part could be arranged externally. However, the figures show a linear generator in which the secondary part to which direct current is applied is moved mechanically by a rising and falling buoy of a wave-driven power station, in order to use the current induced by means of this movement of the secondary part in the primary windings of the primary part for power generation. Instead of the secondary part, the primary part could also carry out a to and fro movement parallel to the axis with the secondary part being stationary, without departing from the scope of protection of the attached claims. In all of the exemplary embodiments mentioned, a preferably externally round rod or tube forms the mechanical transmission element between the buoy and the secondary part in order to allow sealing in the aperture by means of shaft sealing rings on the like in a relatively simple manner, despite the long movement. The transmission or coupling element could, however, also have a different, suitable profile shape and, for example, could comprise a T support or double-T support, a tube, a set of rods or the like, or could have such profiles for stiffening. The seals on the aperture could also comprise bellows seals in order to ensure reliable sealing even with a long movement and large pressure differences.

All of the exemplary embodiments of a wave-driven power station with a buoy are of inventive importance in their own right, and the design principle of each of these wave-driven power stations could also be used together with linear generators in which the primary part and the secondary part are designed in a traditional manner, for example with saturable material between the coils and/or without superconductor windings.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A linear generator for power generation in a wave-driven power station comprising:
   a primary part having a plurality of annular primary coils arranged concentrically with respect to an axis and separated from one another by intermediate elements, and
   a secondary part having a plurality of secondary coils applicable with direct current and arranged axially alongside one another with alternating polarity and having superconductor windings,
   wherein the arrangement of the primary coils in the primary part is in the form of an air-gap winding with the intermediate elements composed of non-magnetizable material, and the secondary coils comprise windings of a high-temperature superconductor, as a result of which force densities of more than 18 N/cm$^2$ can be achieved, wherein the secondary coils are annular and are arranged concentrically with respect to one another around a supporting body, wherein spacing elements are arranged between the secondary coils, on which spacing elements the secondary coils are supported in the axial direction, wherein one of the primary part and the secondary part can be moved parallel to the axis, in an externally operated manner, by a buoy of a wave-driven power station and current which is induced in the primary coils by the relative movement between the primary part and the secondary part is tapped off for power generation.

2. A wave-driven power station comprising:
   a linear generator for power generation, wherein the linear generator has a primary part having a plurality of annular primary coils arranged concentrically with respect to an axis and separated from one another by intermediate elements, and a secondary part having a plurality of secondary coils to which direct current can be applied, the secondary coils being arranged axially alongside one another with alternating polarity and having superconductor windings, wherein the arrangement of the primary coils in the primary part of the linear generator is in the form of an air-gap winding with intermediate elements composed of non-magnetizable material, and the secondary coils comprise windings of a high-temperature superconductor, as a result of which force densities of more than 18 N/cm$^2$ can be achieved, wherein the secondary coils are annular and are arranged concentrically with respect to one another around a supporting body, wherein spacing elements are arranged between the secondary coils, on which spacing elements the secondary coils are supported in the axial direction, wherein one of the primary part and the secondary part can be moved parallel to the axis, in an externally operated manner, by a buoy and wherein current which is induced in the primary coils by the relative movement between the primary part and the secondary part can be tapped off for power generation.

3. The wave-driven power station as claimed in claim 2, wherein the secondary part can be moved mechanically by a rising and falling buoy.

4. The wave-driven power station as claimed in claim 3, wherein the secondary part is connected, such that they move together, to a coupling element which is connected to the buoy in order to transmit the movement of the buoy to the secondary part.

5. The wave-driven power station as claimed in claim 4, wherein the buoy has float bodies whose buoyancy keeps the buoy on water surface, and in that the primary part is arranged in an underwater body, relative to which the buoy can be moved by wave movement of the water.

6. The wave-driven power station as claimed in claim 5, wherein the primary part and the secondary part are arranged in a closed receptacle in the underwater body which, on its upper face, has an aperture for the coupling element, for mechanical transmission of the movement.

7. The linear generator or wave-driven power station as claimed in claim 5, wherein the float bodies of the buoys are arranged around a central aperture which forms an axial guide for the movements between the underwater body and the buoy, wherein the underwater body has a cylindrical outer housing section which is guided in the aperture, sliding elements being arranged between the aperture and the outer housing section.

8. The wave-driven power station as claimed in claim 5, wherein the underwater body is connected to a ballast body which ensures that there is a relatively constant distance between the underwater body and an associated seabed, wherein at least one of the underwater body and the ballast body are anchored on the associated seabed via a mooring cable.

9. The wave-driven power station as claimed in claim 8, wherein the ballast body has at least two platforms which are vertically separated from one another, wherein the intermediate space between the platforms is openable for sea water to enter.

10. The wave-driven power station as claimed in claim 8, wherein the ballast body has a tank which is at least partially filled with sea water, wherein the filling level of the tank is variable.

11. The wave-driven power station as claimed in claim 5, wherein the buoy is provided with fittings to which a free end of the coupling element is attached, and which are arranged within switching and supply devices for the linear generator, wherein the coupling element is used as a line bushing with supply lines to the switching and supply devices.

12. The wave-driven power station as claimed in claim 4, wherein the underwater body has a cylindrical outer housing section, whose lower end is connected to a ballast body and whose outer wall is used as a guide for an underwater sliding element which forms the buoy, the sliding element is moveable relative to the underwater body and is provided with fittings to which the free end of the coupling element is attached.

13. The wave-driven power station as claimed in claim 12, wherein the primary part and the secondary part are arranged in a closed receptacle in the underwater body, and the underwater body is connected to a surface float body which has an aperture for the coupling element on its upper face, and which is provided with guide elements for the fittings, which are connected to them, as an axial guide.

14. The wave-driven power station as claimed in claim 13, wherein switching and supply devices for the linear generator are arranged in the surface float body.

15. The wave-driven power station as claimed in claim 5, wherein the underwater body is attached to an associated seabed, and is anchored to the associated seabed via a base plate wherein a rod end which is passed out of the underwater body is connected by a towing cable to the buoy on the water surface, and the secondary part is movable against the restoring force of a mechanical restoring means by the buoy, and switching and supply devices for the linear generator are arranged in the underwater body.

16. The wave-driven power station as claimed in claim 4, wherein the buoy is in the form of an underwater bell which can be moved by wave power relative to an underwater body which is anchored on an associated seabed and is closed by the underwater bell to form a sealed, gas-filled resonant device, wherein the primary part and the secondary part are arranged in an accommodation area of the resonant device between the underwater body and the underwater bell.

17. The wave-driven power station as claimed in claim 16, wherein the underwater body has a cylindrical outer wall which forms an axial guide for a cylindrical housing section on the underwater bell.

18. The linear generator as claimed in claim 1, wherein the arrangement of the secondary coils in the secondary part is in the form of an air-gap winding.

19. The linear generator as claimed in claim 1, wherein no magnetizable material for concentration of the magnetic flux is arranged between the primary coils of the primary part and between the secondary coils of the secondary part.

20. The linear generator as claimed in claim 1, wherein a current density of more than 50 A/mm$^2$ is applied to the secondary coils, and the magnetic field of the secondary coils is aligned parallel to the axis.

* * * * *